Feb. 17, 1925.
C. H. BROWN
FISHING TOOL
Filed April 30, 1924
1,526,412
2 Sheets-Sheet 1
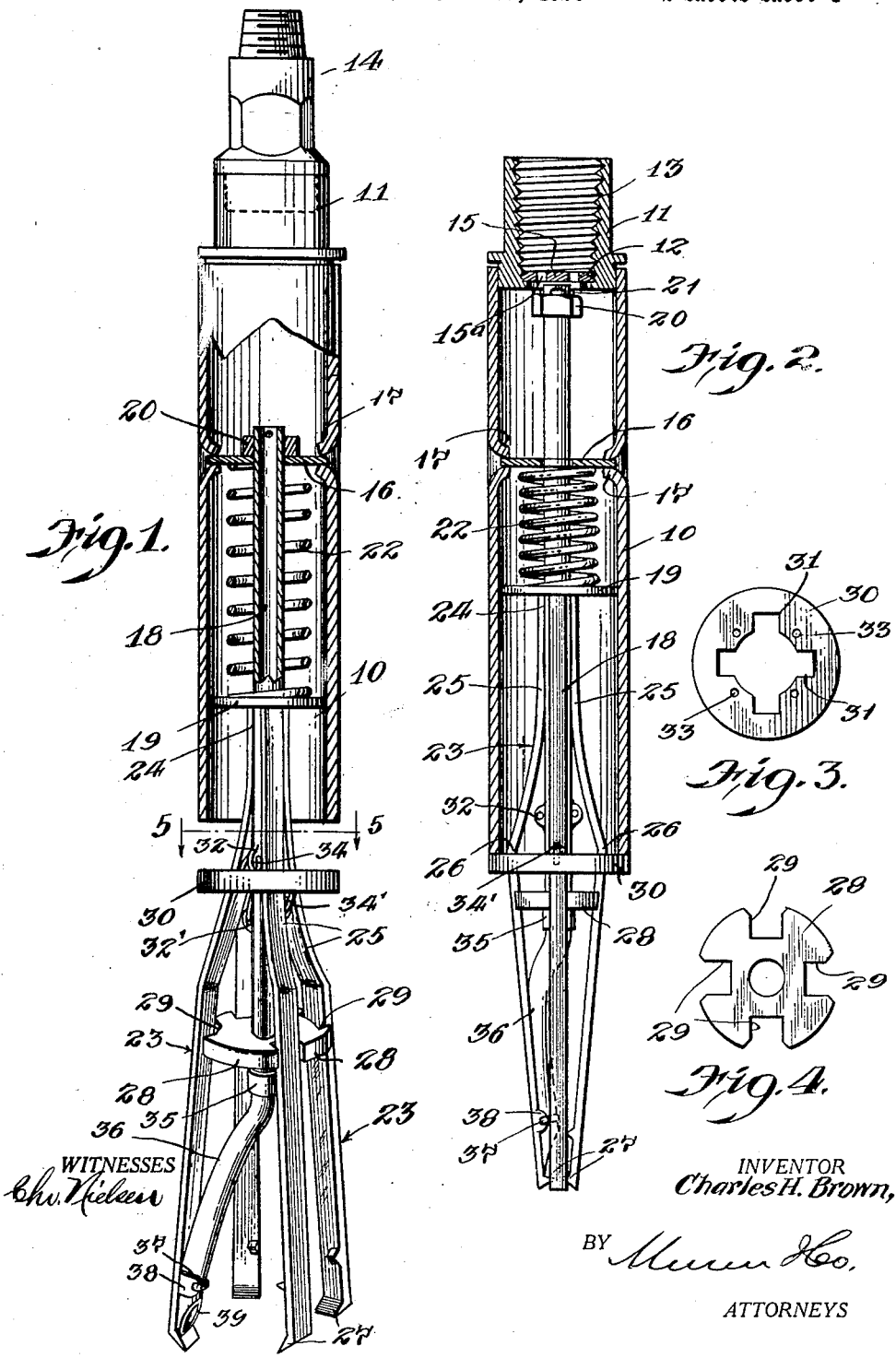
INVENTOR
Charles H. Brown,

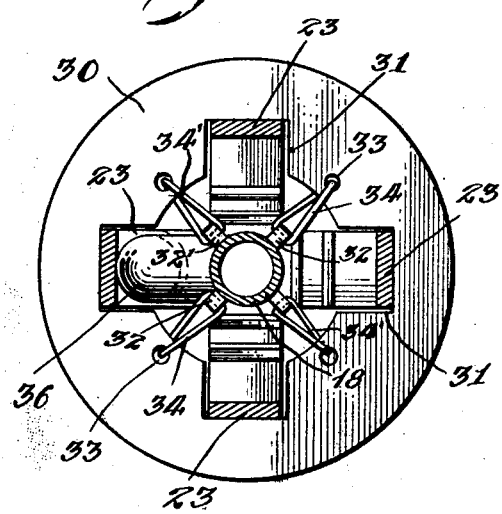
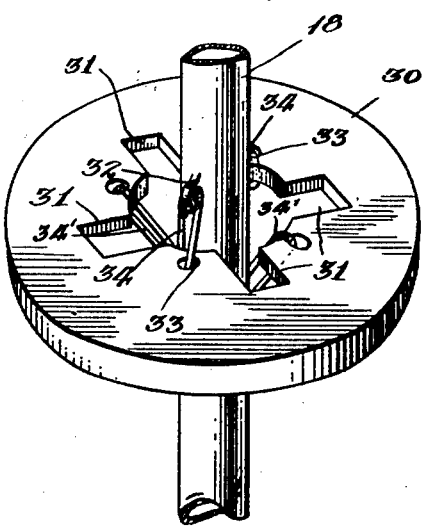
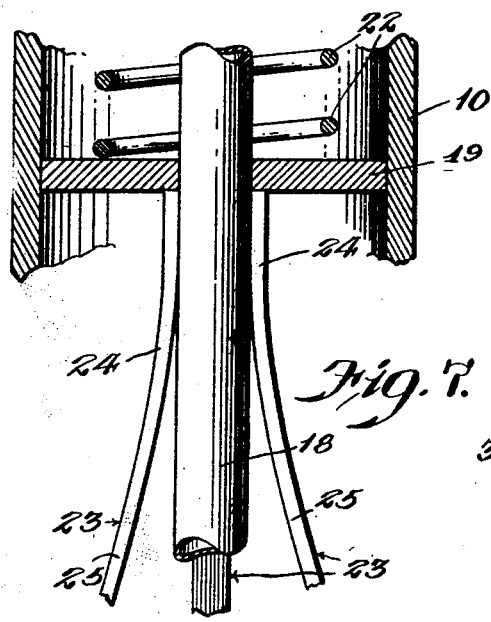
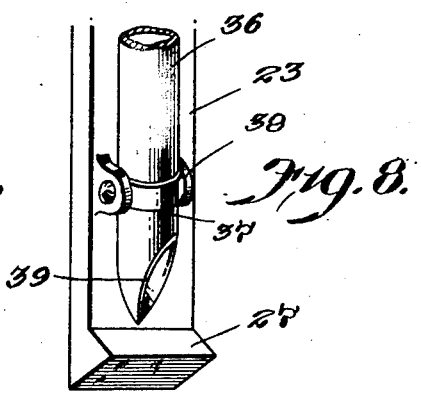

Patented Feb. 17, 1925.

1,526,412

UNITED STATES PATENT OFFICE.

CHARLES HENRY BROWN, OF BRECKENRIDGE, TEXAS.

FISHING TOOL.

Application filed April 30, 1924. Serial No. 710,020.

*To all whom it may concern:*

Be it known that I, CHARLES H. BROWN, a citizen of the United States, and a resident of Breckenridge, in the county of Stephens and State of Texas, have invented certain new and useful Improvements in Fishing Tools, of which the following is a specification.

This invention relates to an improvement in fishing tools of the type forming the subject-matter of my prior Patent No. 1,472,714, granted October 30, 1923.

The object of the invention is to provide a fishing tool of this character which is adapted to meet and successfully deal with the varying conditions met with in actual practice, the fishing tool being designed to work effectively in the recovery of long or large objects or in the recovery of objects in deep cavings as well as to carry out speedily and effectively the recovery of objects under ordinary conditions.

Another object is to provide a fishing tool of this character and having the foregoing enumerated advantages and capacities and wherein provision is made for washing the mud out of the hole while the tool is being lowered into the hole.

Another object is to provide a fishing tool of this character and having these advantages and capacities and in which the grappling fingers are so constituted and so organized with the mandrel as to have the necessary and desirable range of action without danger of setting up crystallization in or fatiguing the metal making up these grappling fingers.

A further object is to provide a fishing tool of this character and in which the grappling fingers are constrained to partake of their proper movements and close automatically around the object to be recovered while being held against closing movement during the passage of the tool through the well casing.

A still further object is to provide a fishing tool of this character and having these advantages and capacities and which is in general of simple and durable construction, reliable and convenient in operation, easy and comparatively inexpensive to manufacture and also so constituted as to facilitate assembly of its various parts.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in elevation, showing one embodiment of the invention and illustrating the grappling fingers in expanded position;

Figure 2 is a view, partly in longitudinal vertical section and partly in elevation and showing the grappling fingers in retracted position;

Figure 3 is a detailed view in plan of the closing plate;

Figure 4 is a similar view of the mandrel head;

Figure 5 is a view in section on line 5—5 of Figure 1;

Figure 6 is a fragmentary perspective view illustrating the means for supporting the closure plate during the passage of the tool through the well casing;

Figure 7 is a fragmentary view, partly in elevation and partly in section, showing the connection of the grappling fingers to the mandrel, the guide plate and associated parts; and Figure 8 is a fragmentary detail perspective view of the lower end of the grappling finger which carries the hose.

Referring to the drawings wherein for the sake of illustration is shown the preferred embodiment of the invention, the numeral 10 designates a barrel or tubular housing. To the upper end of the barrel 10 a connection 11 is coupled. The connection 11 is formed at its lower end with an internal annular flange 12 and from its upper end down to the flange 12 the connection 11 is internally threaded, as at 13. From an inspection of Figure 2 it will be seen that these threads 13 extend down for a considerable distance beyond the point where the drill pipe would be screwed to or beyond the point where the extra sub 14 shown in Figure 1 would extend. As will be readily understood by those skilled in the art the extra sub 14 enables a rotary rig fishing tool to be used on cable type rigs. A perforated abutment plate 15 has its periphery threaded and engaged with the threads 13 just above the flange 12, or is fastened in place against the flange 12 of the connection 11 so as to be readily removable to unscrew the nut 20. This plate 15 may be readily removed through the top of the connection 11 and in assembly it lies below the lower extremity of the drill pipe or of the sub 14. The perforations of the plate 15 are designated at 15ᵃ and have an important function in the process of washing the mud out of the hole while the tool is being lowered into the hole as will be hereinafter more fully explained.

A fixed guide plate 16 is secured within the barrel 10 by means of tongues 17 struck from the barrel 10 and engaged with the plate 16, as shown in Figure 2. The plate 16 is formed with a central guide opening in which a hollow mandrel 18 is mounted for sliding movement. A movable guide plate 19 is fixed to the hollow mandrel 18 and co-acts with the barrel 10 and with the fixed guide plate 16 to constrain the mandrel to sliding movement axially of the barrel 10. A nut 20 is threaded on the upper end of the mandrel 18 and is held against accidental displacement by a cotter pin 21 assembled with a transverse opening in the mandrel. By virtue of the provision of the removable abutment plate 15 the nut 20 and cotter pin 21 may be assembled with the mandrel through the connection 11 and it is not necessary to provide an opening for this purpose in the barrel 10. When the abutment plate 15 is assembled with the connection 11, as shown in Figure 2, it is engageable with the upper end of the mandrel 18 to limit the upward movement of the mandrel.

A compression coil spring 22 is arranged on the mandrel 18 between the fixed guide plate 16 and the movable guide plate 19. One end of the coil spring is engaged with the fixed guide plate 16 and the other end of the coil spring is engaged with the movable guide plate 19 so that the coil spring tends to force the mandrel 18 downwardly and to hold it in its lowermost position with the nut 20 engaged with the fixed guide plate 16.

A plurality of grappling fingers, designated generally at 23 is carried by the mandrel 18. The upper end of each finger 23 is welded or otherwise suitably secured, as at 24, directly to the mandrel below the movable guide plate 19. This guide plate 19 it will be remembered is also fixed to the mandrel as by means of welding or the like. The portions of the fingers 23 which are secured to the mandrel lie flush up against the same and beyond the points where the fingers are secured to the mandrel they curve gradually away from the same, as at 25 to points 26. These fingers slant outwardly when the parts of the tool are positioned as shown in Figure 1. Beyond the points 26 the fingers extend inwardly toward each other to some extent. At their lower extremities the fingers 23 are formed with inwardly extending claws or barbs 27

At the lower end of the mandrel 18 a head 28 is fixed thereto. The head 28 preferably takes the form of a substantially annular plate threaded, welded or otherwise suitably secured to the mandrel. The periphery of the plate 28 is provided at spaced annular intervals with radial recesses 29 in which the grappling fingers 23 are loosely fitted. By virtue of the provision of the recesses 29 the head 28 does not interfere with the expansion or retraction of the fingers but only constrains them to proper movement.

A closing sleeve or plate 30 is provided and is arranged on the fingers 23. As shown to advantage in Figs. 3, 5 and 6 the closing plate 30 is of substantially annular form and has its inner periphery formed at spaced annular intervals with radial notches or recesses 34, one recess being provided for each grappling finger 23. The recesses 31 are designed to permit the plate to slide along the fingers 23 but also enable frictional engagement between the sleeve 30 and the fingers to be had at the proper time as will hereinafter appear. As shown in Figs. 1 and 2 the closure sleeve 30 is arranged below the lower end of the barrel 10 and is engaged by the barrel 10 when actuated to close the fingers 23. In order to prevent these parts from closing the fingers 23 when the tool is being passed through the well casing, apertured lugs 32 are welded on or suitably secured to the mandrel 18 above the closing sleeve 32 and through the apertures of these lugs and through apertures 33 formed in the closure sleeve 30 frangible wires 34 are passed. The wires have their ends secured together to provide complete loops. A similar set of lugs 32' are provided on the mandrel 18 below the sleeve 32 and are connected with the sleeve 32 by means of wire 34' to enable the sleeve 33 to be held against upward movement so that the fingers 23 may be held partially closed or retracted when conditions so require. Of course, the wires 34' may be omitted when not needed.

As has been noted the mandrel 18 is hollow and the longitudinal opening thereof extends entirely therethrough and the ends of the mandrel are open. To the lower end of the mandrel a hose connection 35 is threaded or suitably coupled and to the lower end of this hose connection a hose 36 is connected. The lower end of the hose 36 is secured to one of the fingers 23 by means of a wire or fastening element 37 extending between apertured lugs 38 provided on the finger 23 and engaged with the hose 36. The lower or discharge end of the hose is cut at an angle, as indicated at 39 to provide for a lateral discharge of the fluid from the hose.

With this arrangement the slush or water which is forced down through the connection 11 passes through the apertures 15ᵃ of the plate 15 into the barrel 10, through the hollow mandrel 18 and hose connection 35 into the hose 36, from the discharge end 39 of which it passes laterally into the hole. By this means it is entirely practical to wash the mud out of the hole while the tool is being lowered therein. This is especially desirable in many instances as in fishing around rotary rigs.

When the fishing tool is being lowered down into the well casing the fingers 23 are in expanded position, as shown in Figure 1, and the resistance that may be presented to their movement through the well casing is not sufficient to effect a premature closure of the fingers due to the provision of the coil spring 22 and the frangible wires 34. The coil spring 22 tends to prevent the barrel 10 from moving down along the mandrel and engaging the closing sleeve 30 whereas the frangible wires 34 prevent the sleeve 30 from falling down along the fingers should they be retracted to some extent. When the lower ends of the fingers 23 engage the bottom of the hole the barrel 10 settles down on the mandrel that is it moves downwardly with respect to the mandrel. This movement of the barrel brings its lower end into engagement with the closing sleeve 30 and forces the sleeves 30 down along the grappling fingers 23 to close the fingers around the object sought. Of course the wires 34 are broken down by this process. The fingers 23 are made of resilient and spring material, such as spring steel and consequently, when the sleeve 30 has been forced down to close the fingers around the object engaged then the sleeve will be held in such position by virtue of the binding or frictional engagement subsisting between the same and the fingers.

It is to be understood that it is not necessary for the lower ends of the fingers to engage the bottom of the hole in order to have the fingers automatically close around the objects sought. For instance in fishing for a long object the head 28 at the lower end of the mandrel will engage the object and arrest the downward movement of the mandrel, fingers and closing sleeve while the barrel continues to move downwardly until it engages the sleeve and forces the same down along the fingers to effect the closing of the fingers about the long object.

A similar action takes place where the cavings are so deep that the lower ends of the fingers cannot reach the bottom for when the head 28 strikes these cavings it causes the fingers to close about a portion of the cavings whether the tool reaches the object or not, thereby cleaning the hole until the object can be reached.

This range of action and this automatic operation is had in a construction entirely practical, strong and durable. In this connection it is to be noted that the grappling fingers 13 while possessing the desired resiliency and strength are so constituted as not to be liable to have the metal making up the same fatigued or crystallized due to the novel manner in which the fingers are organized with the mandrel and with the other elements with which they cooperate.

I claim:

1. In a fishing tool, a barrel, a connection at the upper end of the barrel, a perforated or scalloped edged abutment plate in said connection, a hollow mandrel slidably mounted on the barrel, the upper end of the mandrel being open and communicating with the connection through the perforations of the abutment plate, grappling fingers connected to the mandrel, means for automatically closing the fingers upon relative movement of the mandrel and barrel, yieldable means tending to prevent relative movement between the mandrel and the barrel, and a hose connected to the lower end of the mandrel and having a discharge opening at its lower end.

2. In a fishing tool, a barrel, a connection at the upper end of the barrel, a perforated abutment plate in said connection, a hollow mandrel slidably mounted on the barrel, the upper end of the mandrel being open and communicating with the connection through the perforations of the abutment plate, grappling fingers connected to the mandrel, means for automatically closing the fingers upon relative movement of the mandrel and barrel, yieldable means tending to prevent relative movement between the mandrel and the barrel, a hose connected to the lower end of the mandrel and having a discharge opening at its lower end, and means for fastening the lower end of the hose to one of the grappling fingers.

3. In a fishing tool, a barrel, a connection at the upper end of the barrel, a perforated abutment plate in said connection, a hollow mandrel slidably mounted on the barrel, the upper end of the mandrel being open and communicating with the connection through the perforations of the abutment plate, grappling fingers connected to the mandrel, means for automaticallly closing the fingers upon relative movement of the mandrel and barrel, yieldable means tending to prevent relative movement between the mandrel and the barrel, a hose connected to the lower end of the mandrel and having a discharge opening at its lower end, and means for fastening the lower end of the hose to one of the grappling fingers, the lower end of the hose being formed to direct the discharge from the hose laterally.

4. In a fishing tool, a barrel, a mandrel mounted for sliding movement relative to the barrel, grappling fingers carried by the mandrel, means for closing the grappling fingers upon relative movement of the barrel and mandrel, yieldable means tending to prevent relative movement between the mandrel and the barrel, and a head for the lower end of the mandrel.

5. In a fishing tool, a barrel, a mandrel mounted for sliding movement relative to the barrel, grappling fingers carried by the mandrel, means for closing the grappling fingers upon relative movement of the barrel and mandrel, yieldable means tending to prevent relative movement between the mandrel and the barrel, and a head for the lower end of the mandrel, said head having recesses at spaced intervals around its periphery in which the grappling fingers are loosely fitted.

6. In a fishing tool, a barrel, a mandrel slidably mounted on the barrel, resilient grappling fingers carried by the mandrel, a closing sleeve mounted on the fingers, the barrel being adapted to engage the closing sleeve and advance the same around the fingers to close the fingers when the barrel moves downwardly relative to the mandrel, yieldable means tending to prevent the barrel from moving downwardly relative to the mandrel, and means for preventing the sleeve from falling down along the fingers and including a frangible wire connected to the mandrel and to the sleeve.

7. In a fishing tool, a barrel, a mandrel slidably mounted on the barrel, resilient grappling fingers carried by the mandrel, a closing sleeve mounted on the fingers, the barrel being adapted to engage the closing sleeve and advance the same around the fingers to close the fingers when the barrel moves downwardly relative to the mandrel, yieldable means tending to prevent the barrel from moving downwardly relative to the mandrel, and means for preventing the sleeve from falling down along the fingers and including a frangible wire, said mandrel having an apertured lug and said sleeve having an aperture, the frangible wire being passed through the aperture of the lug and the aperture of the sleeve.

8. In a fishing tool, a barrel having a fixed guide plate provided with a central guide opening, a mandrel slidably fitted in the central guide opening in the fixed guide plate, a movable guide plate fixed to the mandrel and cooperable with the barrel, grappling fingers connected to the mandrel, means for closing the grappling fingers when the barrel moves downwardly relative to the mandrel, and a coil spring engaged with the fixed guide plate and the movable guide plate and tending to prevent downward movement of the barrel relative to the mandrel.

9. In a fishing tool, a barrel having a fixed guide plate provided with a central guide opening, a mandrel slidably fitted in the central guide opening in the fixed guide plate, a movable guide plate fixed to the mandrel and cooperable with the barrel, grappling fingers connected to the mandrel, means for closing the grappling fingers when the barrel moves downwardly relative to the mandrel, a coil spring engaged with the fixed guide plate and the movable guide plate and tending to prevent downward movement of the barrel relative to the mandrel, means connected to the upper end of the mandrel and cooperable with the fixed guide plate for limiting the downward movement of the mandrel, a connection at the upper end of the barrel, said connection having an opening extending therethrough and a removable abutment plate mounted in the connection, said abutment plate being engaged by the upper end of the mandrel to limit the downward movement of the barrel with respect to the mandrel.

10. In a fishing tool, a barrel, a mandrel slidably mounted on the barrel, resilient grappling fingers connected to the mandrel, means for closing said fingers when the barrel moves downwardly relative to the mandrel, yieldable means tending to prevent the barrel moving downwardly relative to the mandrel, said grappling fingers having portions fitting flush up against the mandrel and secured thereto and said resilient grappling fingers gradually curving outwardly from the mandrel beyond the points where said fingers are secured to said mandrel.

CHARLES HENRY BROWN.